(12) United States Patent
Naoi et al.

(10) Patent No.: US 10,569,393 B2
(45) Date of Patent: Feb. 25, 2020

(54) ATTACHMENT AND FASTENING TOOL

(71) Applicant: MAKITA CORPORATION, Anjo-shi, Aichi (JP)

(72) Inventors: Yosuke Naoi, Anjo (JP); Takashi Nakane, Anjo (JP); Hiroki Ikuta, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 192 days.

(21) Appl. No.: 15/891,696

(22) Filed: Feb. 8, 2018

(65) Prior Publication Data

US 2018/0229350 A1   Aug. 16, 2018

(30) Foreign Application Priority Data

Feb. 10, 2017 (JP) .................................. 2017-023011
Apr. 28, 2017 (JP) .................................. 2017-090062

(51) Int. Cl.
  *B25B 21/00* (2006.01)
  *F16D 3/16* (2006.01)
  *F16H 1/28* (2006.01)
  *F16H 57/08* (2006.01)

(52) U.S. Cl.
  CPC .......... *B25B 21/007* (2013.01); *B25B 21/002* (2013.01); *F16D 3/16* (2013.01); *F16H 1/28* (2013.01); *F16H 57/08* (2013.01)

(58) Field of Classification Search
  CPC ..... B25B 21/002; B25B 21/007; B25B 21/00; B25B 23/0078; F16D 3/16; F16H 1/28; F16H 57/08; B23P 19/06
  See application file for complete search history.

(56) References Cited

U.S. PATENT DOCUMENTS

| | | | | |
|---|---|---|---|---|
| 4,034,574 A | * | 7/1977 | Kuder | B25B 13/06 464/106 |
| 4,535,653 A | * | 8/1985 | Coburn | B25B 17/02 192/3.52 |
| 4,627,310 A | * | 12/1986 | Coburn | B25B 17/02 192/3.52 |

(Continued)

FOREIGN PATENT DOCUMENTS

JP    3129070 U    2/2007
JP    2010-284742 A    12/2010

*Primary Examiner* — David B. Thomas
(74) *Attorney, Agent, or Firm* — Oliff PLC

(57) ABSTRACT

An attachment includes a planetary reducer, a reaction force receiving member, and a universal joint. The planetary reducer has a first output shaft and a second output shaft connectable to a socket. The reaction force receiving member is connected to the first output shaft and has an arm part for contact with an external contact object. The universal joint has an input-side end part connectable to a final output shaft of a fastening tool and an output-side end part connected to the planetary reducer. The reaction force receiving member is configured to rotate integrally with the first output shaft in a direction opposite to the second output shaft by a reaction force caused by rotation of the socket. The universal joint is configured to transmit the torque inputted from the final output shaft via the input-side end part, to the planetary reducer via the output-side end part.

9 Claims, 12 Drawing Sheets

(56) References Cited

U.S. PATENT DOCUMENTS

| | | | | |
|---|---|---|---|---|
| 5,540,629 | A * | 7/1996 | Gotman | B25B 13/488 |
| | | | | 475/248 |
| 6,487,940 | B2 * | 12/2002 | Hart | B25B 13/488 |
| | | | | 81/55 |
| 7,018,298 | B1 * | 3/2006 | Chiou | F16D 1/116 |
| | | | | 464/106 |
| 8,403,763 | B2 * | 3/2013 | Hu | F16D 3/16 |
| | | | | 403/123 |
| 8,443,699 | B2 * | 5/2013 | Ha | B25B 13/463 |
| | | | | 81/475 |
| 8,584,554 | B2 * | 11/2013 | Chen | B25B 17/02 |
| | | | | 81/54 |
| 9,016,173 | B1 * | 4/2015 | Saftoiu | B25B 21/005 |
| | | | | 81/57.4 |
| 9,056,390 | B2 * | 6/2015 | Hellstrom | B25B 23/0078 |
| 2008/0098856 | A1 * | 5/2008 | Ha | B25B 17/02 |
| | | | | 81/57.3 |
| 2016/0006204 | A1 * | 1/2016 | Baumler | H01R 43/26 |
| | | | | 29/825 |
| 2017/0348835 | A1 * | 12/2017 | Skelly | B25B 23/0078 |

* cited by examiner

ATTACHMENT AND FASTENING TOOL

CROSS-REFERENCE TO RELATED APPLICATION

The present application claims priority to Japanese patent application No. 2017-023011 filed on Feb. 10, 2017, and Japanese patent application No. 2017-090062 filed on Apr. 28, 2017. The contents of the foregoing applications are incorporated fully herein by reference.

TECHNICAL FIELD

The present invention relates to an attachment that is configured to be removably attached to a fastening tool, and a fastening tool having the attachment.

BACKGROUND

A fastening tool is known which is specifically designed for fastening a bolt or a nut having a relatively large nominal diameter and which is capable of outputting a high torque and has a reaction receiver. Generally, however, such a dedicated fastening tool is heavy and expensive. Therefore, an attachment is available which has a power increasing device and which can be removably attached to a fastening tool having a lower output torque than the dedicated fastening tool. In Japanese Utility Model No. 3129070, for example, a fastening aid power unit is disclosed which is configured to be removably attached to an electric driver and has a planetary gear power increasing device and a reaction receiver.

SUMMARY

The fastening aid power unit which is mentioned above is coaxially mounted on an output shaft of the electric driver. As a result, the electric driver having the fastening aid power unit is increased in size as a whole in the extending direction of the output shaft. Therefore, workability may be reduced in some operation environments such as in a narrow space.

Accordingly, it is an object of the present teachings to provide a technique, for an attachment which is configured to be removably attached to a fastening tool, which may contribute to an improvement of workability of the fastening tool with the attachment attached thereto.

According to an aspect of the present teachings, an attachment is provided which is configured to be removably attached to a fastening tool, the fastening tool having a final output shaft configured to be rotationally driven by power of a motor. The attachment includes a planetary reducer, a reaction force receiving member and a universal joint.

The planetary reducer has a first output shaft and a second output shaft which are coaxially arranged and rotatable in opposite directions to each other. The reaction force receiving member is connected to the first output shaft so as to rotate integrally with the first output shaft. The reaction force receiving member has an arm part for contact with an external contact object. The universal joint is configured to transmit a torque. The universal joint has an input-side end part to which the torque is inputted and an output-side end part from which the torque is outputted. The input-side end part is configured to be connectable to the final output shaft of the fastening tool. The output-side end part is connected to the planetary reducer. The second output shaft is configured to be connectable to a socket such that the socket rotates integrally with the second output shaft. The socket is engageable with a bolt or a nut. The reaction force receiving member is configured to rotate integrally with the first output shaft in a direction opposite to the second output shaft by a reaction force caused by rotation of the socket. The universal joint is configured to transmit the torque inputted from the final output via the input-side end part, to the planetary reducer via the output-side end part.

When the attachment of the present aspect is attached to the fastening tool, a torque of the final output shaft of the fastening tool is transmitted to the planetary reducer via the universal joint and increased by the planetary reducer. Therefore, the fastening tool which is lighter and less expensive than a dedicated fastening tool with a reaction receiver can be used to fasten a bolt or a nut having a large nominal diameter. Further, the fastening tool and the planetary reducer are connected to each other via the universal joint. The universal joint is a shaft coupling which is configured to transmit a torque between two rotary bodies without being affected by a change of the position or angle relation between rotation axes of the two rotary bodies. Therefore, the user can freely change the position or angle relation between the rotation axis of the final output shaft of the fastening tool and the rotation axis of the planetary reducer, depending on the environment in which an operation of fastening bolts or nuts is performed. Thus, the workability of the fastening tool with the attachment attached thereto can be improved.

A typical example of the fastening tool may be a power tool for fastening a screw, bolt or nut via a tool accessory or a socket coupled to the final output shaft which is rotationally driven. Typical examples of such a power tool may include a screwdriver and a driver drill. Further, the fastening tool may also include a rotary tool (such as an electric drill) having a chuck which is configured to be turned around a prescribed driving axis in order to fasten and mount a tool accessory thereto, and configured to rotationally drive the final output shaft around the driving axis and thereby rotationally drive the tool accessory.

Typically, the planetary reducer may include a planetary gear mechanism having a sun gear, planetary gears, a carrier, and an internal gear. The planetary reducer may include only one planetary gear mechanism. Alternatively, the planetary reducer may include two or more planetary gear mechanisms. The planetary reducer of the present aspect is configured to have two output shafts (the first output shaft and the second output shaft). Typically, the internal gear and the carrier may be employed as the first output shaft and the second output shaft, respectively. Further, the feature that the first and second output shafts are "rotatable in opposite directions to each other" may mean that, as a reaction force (reaction) of a torque which acts on one of the first and second output shafts, a torque (a reaction torque) as large as this torque acts on the other output shaft in the opposite direction and the other output shaft rotates in the opposite direction.

The reaction force receiving member may be connected to the first output shaft directly or indirectly (in other words, via a separate intervening member which is configured to rotate integrally with the first output shaft). Similarly, the socket may be connected to the second output shaft directly or indirectly (in other words, via a separate intervening member which is configured to rotate integrally with the second output shaft). Further, typically, a bolt, a nut, or another object which is disposed nearby may be used as the external contact object for contact with the arm part of the reaction force receiving member. For this purpose, it may be preferable that the reaction force receiving member is configured to be removably attached to the first output shaft such that a plural kinds of such reaction force receiving members different in the shape and size of the arm part can be replaced, depending on the arrangement relation between the bolt or nut to be fastened and the contact object. Further, the reaction force receiving member may typically have a base part (typically, a cylindrical part) which may be directly or indirectly connected to the first output shaft, and the arm part. The arm part may include a part extending in a direction (typically, a radial direction) crossing the rotation axis of the first output shaft. The arm part may be shaped straight as a whole or shaped to have a bent part such as an L-shaped part.

The type of the universal joint is not limited, as long as the universal joint is configured to transmit a torque between two rotary bodies. For example, a ball type universal joint or a cross shaft universal joint may be employed. The shape and the mounting manner of the input-side end part are not limited, as long as the input-side end part of the universal joint can be connected to the final output shaft of the fastening tool so as to rotate integrally with the final output shaft. Further, the input-side end part may be configured to be connected to the final output shaft of the fastening tool directly or indirectly (in other words, via a separate intervening member which rotates integrally with the final output shaft).

According to an aspect of the present teachings, the planetary reducer may include at least one planetary gear mechanism each having a sun gear, planetary gears, a carrier, and an internal gear. The first output shaft may be the internal gear of a final stage planetary gear mechanism of the at least one planetary gear mechanism, and the second output shaft may be the carrier of the final stage planetary gear mechanism. According to the present aspect, the attachment can be provided with a compact and rational structure. It is noted that, when the planetary reducer includes only one planetary gear mechanism, the "final stage planetary gear mechanism" used herein refers to the planetary gear mechanism, and when the planetary reducer includes a plurality of planetary gear mechanisms, it refers to one of the planetary gear mechanisms which is located on the most downstream side in a torque transmitting direction.

According to an aspect of the present teachings, the speed reduction ratio of the planetary reducer may be at least 10. In other words, the planetary reducer may be configured to decelerate the rotation speed to one tenth or less and transmit the power. According to the present aspect, the torque inputted from the final output shaft of the fastening tool via the universal joint can be increased to ten times or more. Therefore, a fastening tool having a relatively low output torque can be used to perform an operation of fastening a bolt or nut which requires a high torque.

According to an aspect of the present teachings, the reaction force receiving member may have projections formed in a circumferential direction around a rotation axis of the first output shaft, and the first output shaft may have recesses formed in the circumferential direction. The reaction force receiving member and the first output shaft may be connected to each other by engagement between the projections and the recesses. One of the projections which is formed corresponding to a base end region of the arm part and one of the recesses which is formed corresponding to this projection may be wider in the circumferential direction than the other projections and the other recesses, respectively. According to the present aspect, the base end region of the arm part to which a strong force may be applied when the contact object receives the reaction force caused by the rotation of the socket can be provided with adequate strength.

According to an aspect of the present teachings, a fastening tool is provided which includes a motor, a final output shaft, and an attachment. The motor includes a rotor and a motor shaft that is configured to rotate integrally with the rotor. The final output shaft is configured to be rotationally driven by power of the motor. The attachment is removably connected to the final output shaft so as to rotate integrally with the final output shaft. The attachment as defined in any one of the above-described aspects can be employed as the attachment. The fastening tool of the present aspect with the attachment attached thereto can obtain the same effect as in the above-described aspects.

According to an aspect of the present teachings, the fastening tool may be configured to operate at least in a fastening operation mode. In the fastening operation mode, the motor shaft is rotated in a normal rotation direction to fasten the bolt or the nut. Further, in the fastening operation mode, driving of the final output shaft is stopped when a fastening torque of the bolt or the nut reaches a preset target torque. In addition, a rotation speed of the reaction force receiving member is set based on a time from when driving of the motor is started and to when the fastening torque reaches the preset target torque and a time required for a user to take an action to avoid an interference between the arm part and an intervening object when the intervening object exists between the arm part and the external contact object.

With the fastening tool that is configured to let the contact object receive the reaction force via the arm part, the arm part may interfere with the intervening object during the rotation of the reaction receiving member, if the arm part is disposed apart from the contact object and the fastening operation is started in a state in which the intervening object exists between the arm part and the contact object. Therefore, as in the present aspect, by setting the rotation speed of the reaction receiving member based on the time required for the fastening torque to reach the target torque and the time required for the user to take the action to avoid the interference, it may be possible to make the time required to fasten the bolt or nut as short as possible, while reducing the possibility of interference between the arm part and the intervening object.

It is noted that, in the present aspect, the target torque here may be a preset uniform value, or may be set in response to an external operation by the user. Further, the driving of the final output may be stopped by interrupting the power transmission to the final output when the fastening torque reaches the target torque, or may be stopped by stopping the driving of the motor. The fastening torque may be detected as a value of the electric current of the motor or a strain of the first output shaft that has a prescribed correlation with the fastening torque. In such a case, a control unit may stop the driving of the motor based on the detected value and a value corresponding to the target torque.

The action of the user to avoid interference between the arm part and the intervening object may include an action to move the intervening object, an action to stop the rotation of the reaction receiving member and so on. An average reaction time for a person's body to react after the person visually recognizes an object may be employed as the time required to take such an action.

According to an aspect of the present teachings, a rotation speed of the reaction force receiving member may be set in a range from 60 rpm (rotations per minute) through 100 rpm. Considering the reaction time for a person's body to react after the person visually recognizes an object, the rotation speed may preferably be not faster than 100 rpm. On the other hand, as a fastening tool that is configured to fasten a bolt or nut, a so-called rotary impact tool is known. Such impact tools may include an impact wrench, an impact driver and so on. The fastening tool with the attachment attached thereto may be used in place of the rotary impact tool, as the fastening tool which generates less noises during the fastening operation of the bolt or nut, compared to the rotary impact tool. If the rotation speed of the reaction receiving member is slower than 60 rpm, the time required for the fastening may become too long, compared to the rotary impact tool. Therefore, by setting the rotation speed of the reaction receiving member within the range defined in the present aspect, it may be possible to ensure the work efficiency that is generally equal to that of the rotary impact tool, while reducing the possibility of interference between the arm part and the intervening object. It may be more preferable for the rotation speed of the reaction receiving member to fall within a range from 70 rpm through 90 rpm, and further preferable to be about 80 rpm.

According to an aspect of the present teachings, the fastening tool may further include a torque setting member configured to set the target torque in response to an external operation by the user. In this case, the user can set the target torque depending on the type (the nominal diameter, etc.) of the bolt or nut to be fastened by the fastening tool.

According to an aspect of the present teachings, the fastening tool may be further configured to operate in a loosening operation mode. In the loosening operation mode, the motor shaft may be rotated in a reverse rotation direction to loosen the bolt or the nut. Further, a torque of the second output shaft in the loosening operation mode may be set to be greater than a maximum torque of the second output shaft in the fastening operation mode. When a bolt or nut, which has been tightened, is loosened, a larger torque is required than that required when the bolt or nut was fastened. According to the present aspect, the bolt or nut can be loosened with an appropriate torque in the loosening operation mode.

DETAILED DESCRIPTION OF THE EMBODIMENTS

An embodiment is now described with reference to the drawings. In the following embodiment, an attachment 1 which has a reaction force receiving member 4 and which is configured to be attached to a fastening tool to fasten (tighten) a bolt or a nut is described as an example. Further, an electric driver drill 5 which is capable of performing a screw fastening operation and a drilling operation is described as an example of a fastening tool to which the attachment 1 can be removably attached. It is noted that the structure of the driver drill 5 is well known and therefore only briefly explained here.

Figure 1:
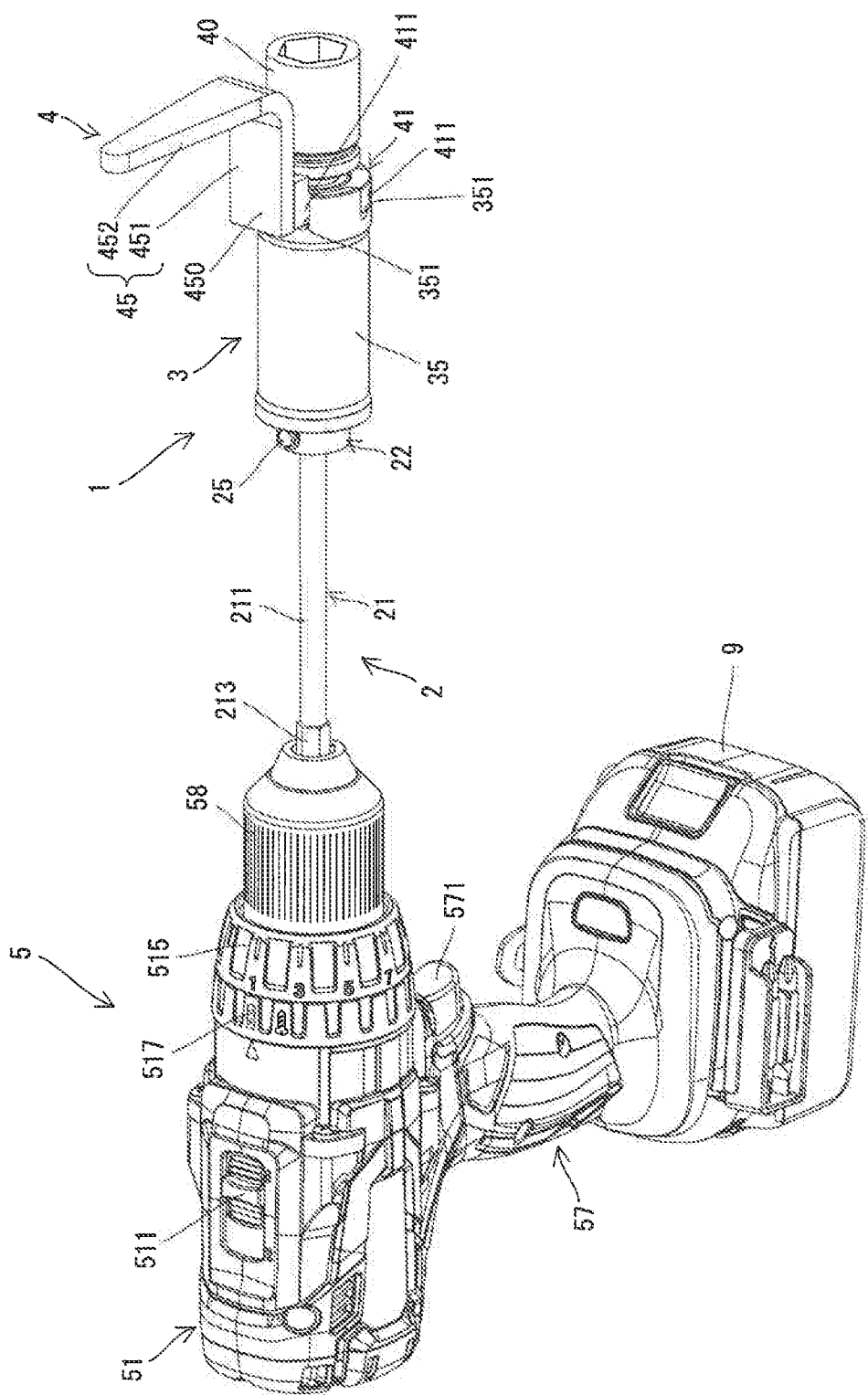
FIG. 1 is a perspective view showing an attachment attached to a driver drill.
Figure 2:
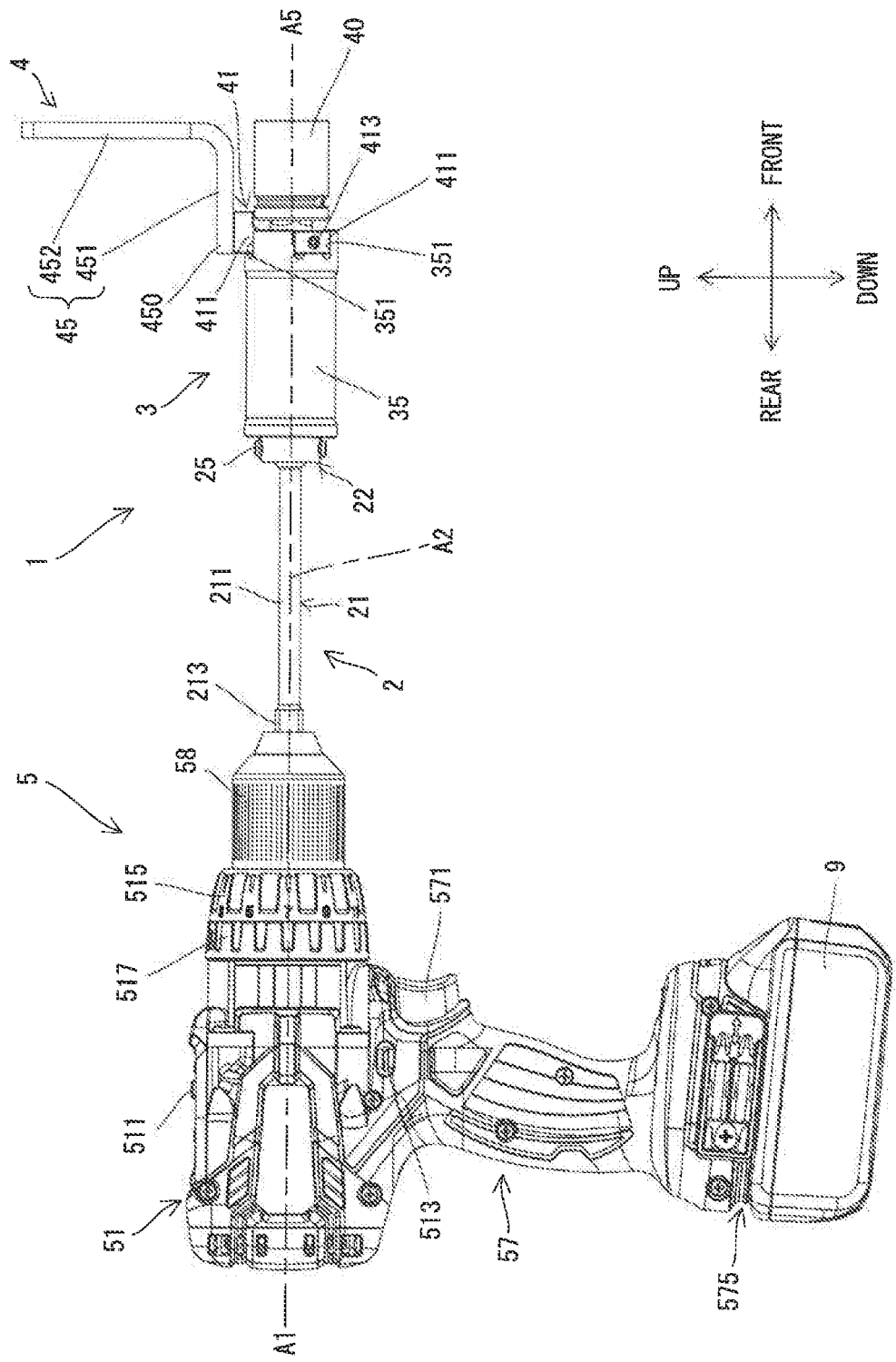
FIG. 2 is a side view of the attachment attached to the driver drill.

First, the external configuration of the driver drill 5 is described. As shown in FIGS. 1 and 2, an outer shell of the driver drill 5 is mainly formed with a body housing 51 and a handle 57. The body housing 51 extends along a prescribed driving axis A1. A chuck 58 protrudes along the driving axis A1 from one end (axial end) of the body housing 51 in the extending direction of the driving axis A1 and is configured such that a tool accessory (typically for the screw fastening or the drilling operation) can be removably attached thereto. The handle 57 is configured to be held by a user and extends from the body housing 51 in a direction crossing (generally perpendicular to) the driving axis A1. A trigger 571 is provided on a base end part of the handle 57 and configured to be depressed by the user. A rechargeable battery 9 is removably mounted on a protruding end of the handle 57 via a battery mounting part 575.

In the following description relating to directions of the driver drill 5, for the sake of explanation, the extending direction of the driving axis A1 is defined as a front-rear direction of the driver drill 5, in which one side having the chuck 58 is defined as a front side and the opposite side is defined as a rear side. Further, a direction perpendicular to the driving axis A1 and corresponding to the extending direction of the handle 57 is defined as an up-down direction, in which one side having the body housing 51 is defined as an upper side and the other side to which the battery 9 is mounted is defined as a lower side. A direction perpendicular to the front-rear direction and the up-down direction is defined as a left-right direction.

A speed change lever 511 is provided on an upper surface of the body housing 51. The speed change lever 511 is arranged to be movable in the front-rear direction, and the speed reduction ratio of a planetary reducer 53 (which is described below; see FIG. 3) (in other words, the rotating speed and an output torque of a spindle 55) can be switched by user's operation of switching the position of the speed change lever 511. A normal/reverse changeover lever 513 is provided on a lower end part of the body housing 51. The normal/reverse changeover lever 513 is arranged to be movable in the left-right direction, and the rotating direction of an output shaft 521 of a motor 52 (see FIG. 3) can be switched between a normal rotation direction (a screw fastening direction) and a reverse rotation direction (a screw loosening direction) by user's operation of switching the position of the normal/reverse changeover lever 513.

Further, a torque adjusting ring 515 and a mode switching ring 517 are provided on a front end part of the body housing 51. The torque adjusting ring 515 is arranged to be rotatable around the driving axis A1. By turning the torque adjusting ring 515, the user can adjust a threshold for a torque at which a clutch mechanism 54 (which is described below) interrupts torque transmission. It is noted here that when the attachment 1 that is described later is attached to the driver drill 5, the threshold that is set via the torque adjusting ring 515 corresponds to a target value of a fastening torque (hereinafter referred to as a target torque) of the bolt or nut to be fastened using the attachment 1. The mode switching ring 517 is arranged to be rotatable around the driving axis A1. By turning the mode switching ring 517, the user can switch the operation mode of the driver drill 5. The operation modes of the driver drill 5 includes two types, that is, a screw fastening mode in which the clutch mechanism 54 is actuated, and a drilling mode in which the clutch mechanism 54 is not actuated.

The internal configuration of the driver drill 5 is now described.

Figure 3:
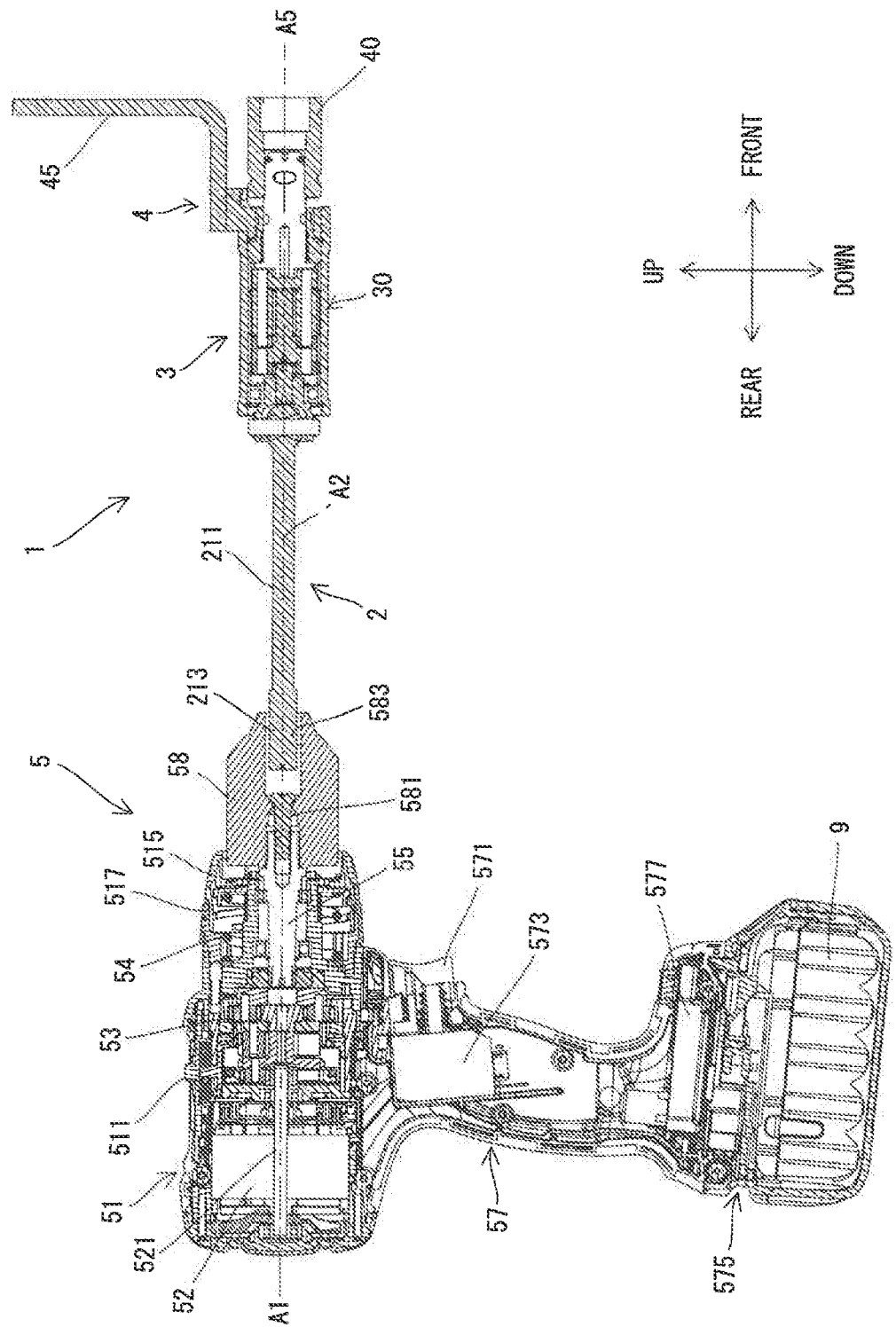
FIG. 3 is a longitudinal sectional view of the attachment attached to the driver drill.

As shown in FIG. 3, the body housing 51 houses the motor 52, the planetary reducer 53, the clutch mechanism 54 and the spindle 55.

In this embodiment, a compact and high-output blushless DC motor is employed as the motor 52. The motor 52 is arranged within a rear end part of the body housing 51 such that a rotation axis of the output shaft 521 which rotates together with a rotor (not shown) extends on the driving axis A1. The planetary reducer 53 is configured as a speed reducing mechanism including three planetary gear mechanisms and arranged in front of the motor 52. The planetary reducer 53 increases the torque inputted from the output shaft 521 of the motor 52 and outputs the increased torque to the spindle 55 which is a final output shaft of the driver drill 5. As a result, the spindle 55 is rotationally driven around the driving axis A1. The chuck 58 is coaxially connected to the spindle 55 with a bolt 581 so as to rotate integrally with the spindle 55. The clutch mechanism 54 is arranged in front of the planetary reducer 53. The clutch mechanism 54 is configured to interrupt the torque transmission to the spindle 55 when the torque outputted from the planetary reducer 53 reaches the preset threshold in the screw fastening mode. As described above, the threshold that is set via the torque adjusting ring 515 corresponds to the target torque. Therefore, in a case where the attachment 1 is attached to the driver drill 5 and the bolt or nut is fastened, it can be said that the clutch mechanism 54 interrupts the torque transmission to the spindle 55 when the fastening torque of the bolt or nut reaches the target torque.

A switch 573 is disposed on the rear side of the trigger 571 within the handle 57. The switch 573 is turned on in response to the depressing of the trigger 571 and outputs an ON signal, while the switch 573 is turned off in response to the releasing of the trigger 571 and outputs an OFF signal. The battery mounting part 575 is provided on the lower end of the handle 57 as described above. Further, a controller 577 for controlling the driver drill 5 such as controlling the driving of the motor 52 is disposed within a lower end part of the handle 57 (on the upper side of the battery mounting part 575).

When the screw fastening operation or drilling operation is performed, a tool accessory which is appropriate to the intended operation is mounted to the chuck 58 by the user. The chuck 58 has a plurality of jaws (not shown) and is configured such that the jaws are opened by turning (loosening) the chuck 58 in a prescribed direction around the driving axis A1 and closed by turning (tightening) the chuck 58 in the opposite direction. In order to mount the tool accessory, the user loosens the chuck 58, inserts a base end part of the tool accessory into a tool insertion hole 583 of the chuck 58 and then tightens the chuck 58. When the trigger 571 is depressed by the user, the motor 52 is driven and the tool accessory mounted to the chuck 58 is rotationally driven together with the spindle 55 around the driving axis A1. Thus the operation is performed.

In the screw fastening mode, when the torque outputted from the planetary reducer 53 reaches the threshold, the clutch mechanism 54 is actuated to interrupt the torque transmission to the spindle 55, so that the screw fastening operation is completed. When the user releases the trigger 571, the motor 52 stops driving. In the drilling mode, the clutch mechanism 54 is not actuated, and when the user releases the trigger 571, the motor 52 stops and thus the spindle 55 stops rotating, so that the drilling operation is completed.

The attachment 1 which is configured to be attached to the driver drill 5 to fasten a bolt or a nut is now described. As described above, the driver drill 5 is a fastening tool which is capable of performing the screw fastening operation and the drilling operation and is not basically designed to perform an operation of fastening a bolt or a nut having a large nominal diameter (typically of 10 millimeters (mm) or larger) which requires a high torque of about 100 newton-meter (N·m) or higher. The attachment 1 is provided to make it possible to fasten bolts or nuts having a large nominal diameter with the driver drill 5.

Figure 4:
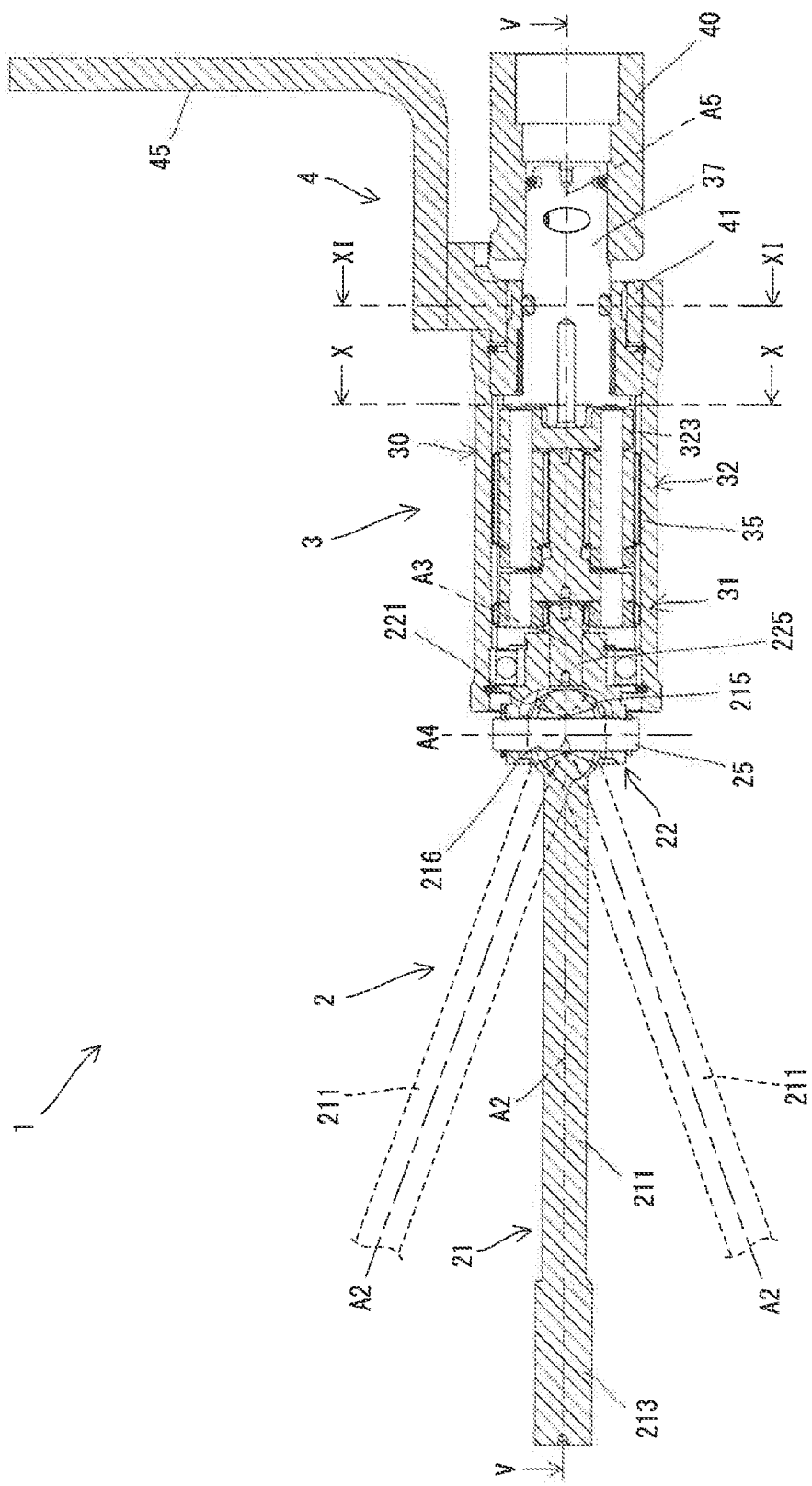
FIG. 4 is a sectional view of the attachment.
Figure 5:
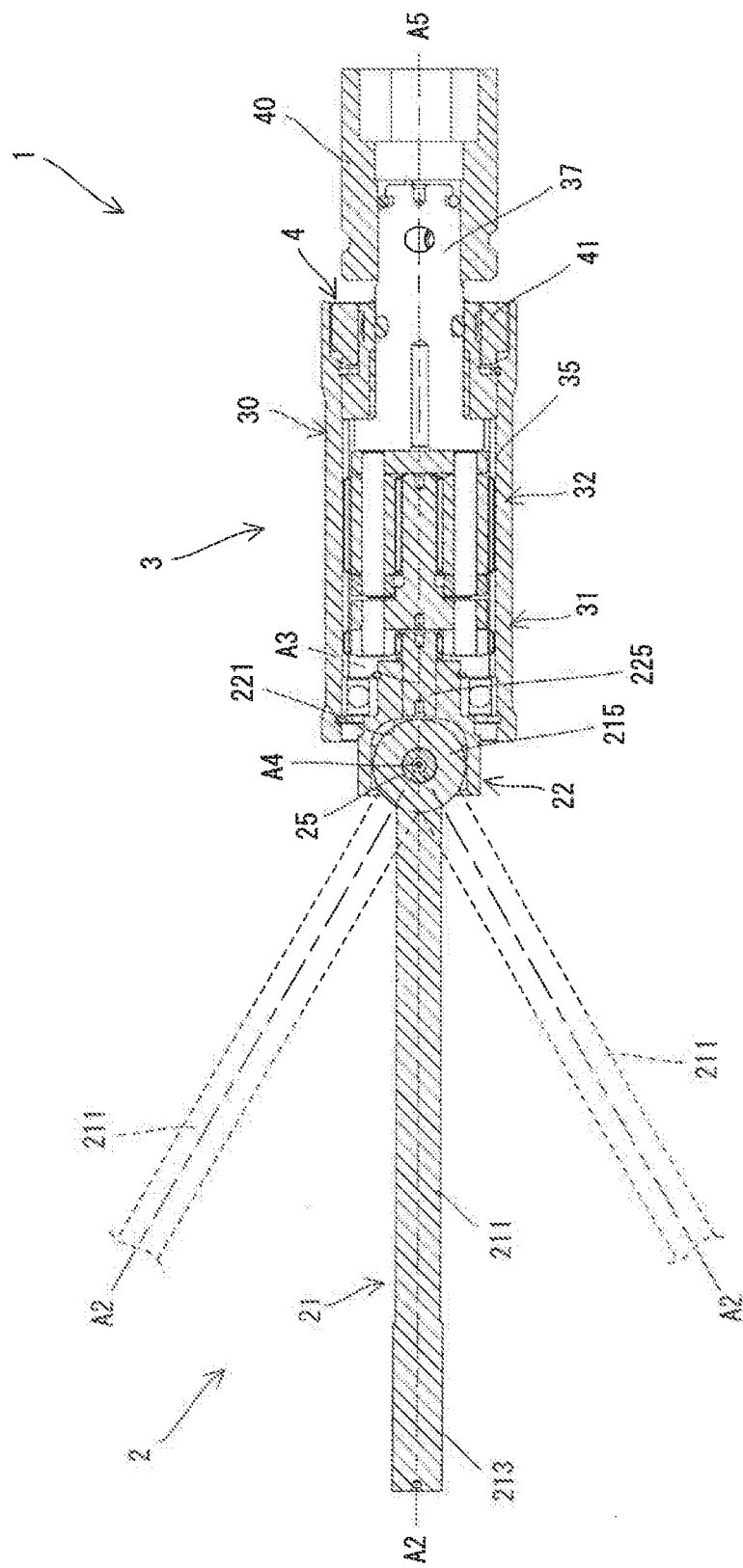
FIG. 5 is a sectional view taken along line V-V in FIG. 4.

As shown in FIGS. 1, 4 and 5, the attachment 1 includes a universal joint 2 and a main unit 3, which are now described in detail.

Figure 6:
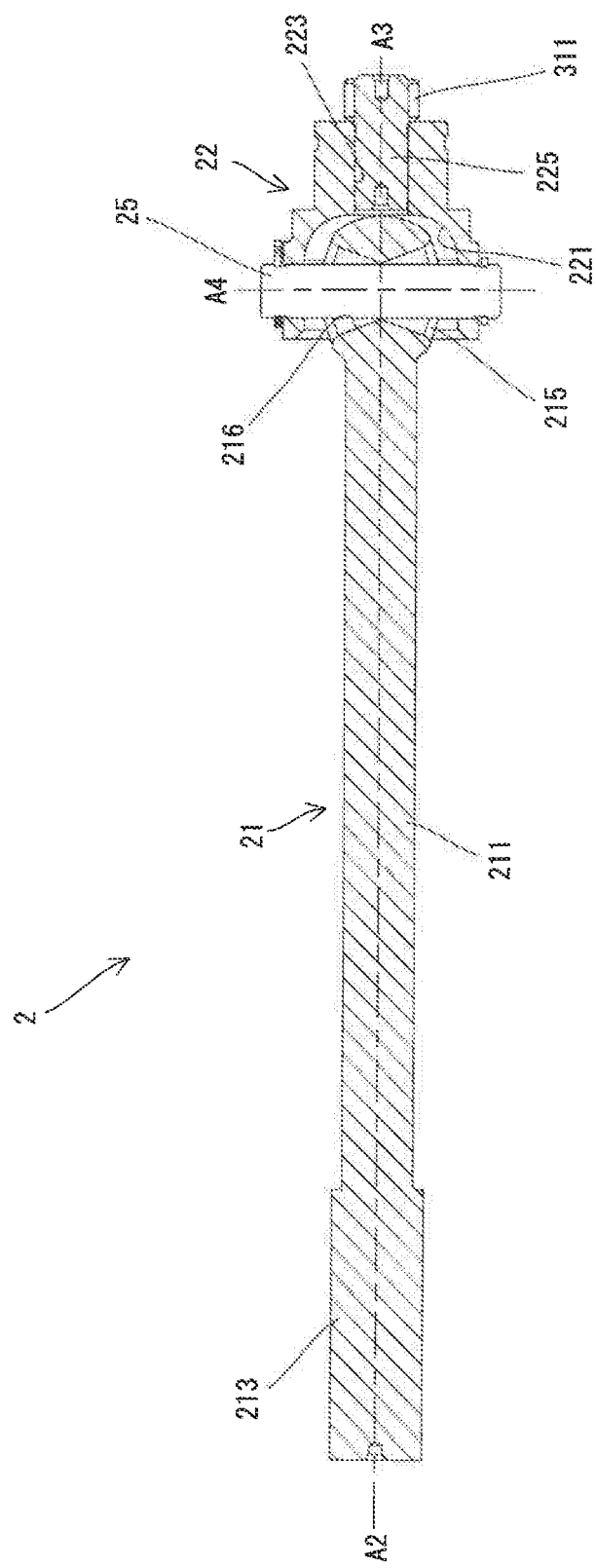
FIG. 6 is a sectional view of a universal joint shown corresponding to FIG. 4.
Figure 7:
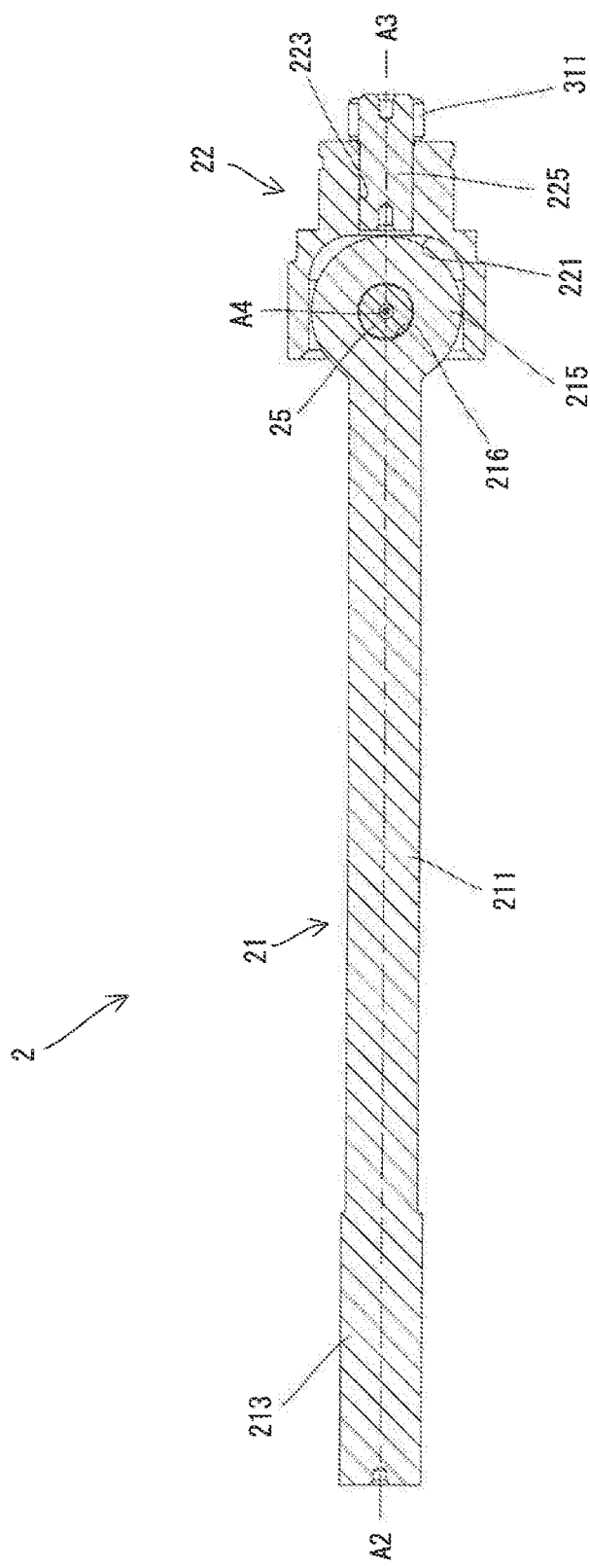
FIG. 7 is a sectional view of the universal joint shown corresponding to FIG. 5.

First, the universal joint 2 is described. The universal joint 2 is a shaft coupling which is configured to transmit a torque between two rotary bodies without being affected by a change of the position or angle relation between rotation axes of the two rotary bodies. As shown in FIGS. 6 and 7, the universal joint 2 of this embodiment includes a first member 21, a second member 22 and a pin 25.

The first member 21 is configured as an input-side member to which the torque of the spindle 55 of the driver drill 5 is transmitted (inputted). The first member 21 is shaped like a long shaft as a whole. The first member 21 includes a linearly extending shaft part 211, a connection part 213 connected to one end of the shaft part 211, and a spherical part 215 connected to the other end of the shaft part 211.

The connection part 213 is configured to be removably attached to the chuck 58 of the driver drill 5. In this embodiment, the shaft part 211 is formed in a round rod shape, and the connection part 213 is formed in a hexagonal columnar shape which can be inserted into the tool insertion hole 583 (see FIG. 1). The connection part 213 is an input-side end part of the universal joint 2 to which the torque of the spindle 55 is inputted via the chuck 58. The connection part 213 can also be referred to as an end part of the universal joint 2 which is located on the most upstream side in a torque transmitting direction. The spherical part 215 has a spherical shape having a larger diameter than the shaft part 211. Further, the spherical part 215 has a through hole 216 extending in a direction perpendicular to an axis A2 of the shaft part 211. The through hole 216 has a central part having substantially the same diameter as the pin 25 and is configured to have a diameter increasing toward opposite open ends from the central part. In other words, the inner wall surface of the spherical part 215 which defines the through hole 216 is a tapered surface having a generally conical shape tapered toward the central part from the opposite open ends.

The second member 22 is configured as an output-side member which transmits the torque to a planetary reducer 30 which is described below. The second member 22 is a cylindrical columnar member having a larger diameter than the spherical part 215 of the first member 21 as a whole. The second member 22 has a recess 221 recessed from its one end surface (axial end surface) toward the center in the direction of an axis A3 of the second member 22. The spherical part 215 is housed in the recess 221 and supported by the second member 22 via the cylindrical pin 25 inserted through the insertion hole 216. As described above, the through hole 216 of the spherical part 215 is configured to have a diameter increasing toward the opposite open ends from the central part. Therefore, as shown by dotted lines in FIG. 4, the angle of the spherical part 215 with respect to an axis A4 of the pin 25 can be changed up to a position at which the tapered surface defining the through hole 216 of the spherical part 215 comes into contact with an outer circumferential surface of the pin 25. In this embodiment, the angle range is about 20 degrees each to either side with respect to the axis A4 (about 40 degrees in total). Further, as shown by dotted lines in FIG. 5, the spherical part 215 can be rotated around the axis A4 of the pin 25 within a prescribed angle range in the recess 221. In this embodiment, this angle range is about 60 degrees.

Due to the above-described structure, the relative position and angle of the axis A2 of the shaft part 211 with respect to the axis A3 of the second member 22, or the relative position and angle of the first member 21 with respect to the second member 22 can be freely changed by the user.

Further, as shown in FIGS. 6 and 7, the second member 22 has a through hole 223 extending along the axis A3 from the recess 211 to the other end. A shaft part 225, which serves as an input shaft of the planetary reducer 30 (which is described below), is press-fitted into the through hole 223. In other words, the shaft part 225 is an output-side end part of the universal joint 2 which outputs the torque to the planetary reducer 30. The shaft part 225 can also be referred to as an end part of the universal joint 2 which is located on the most downstream side in the torque transmitting direction.

The main unit 3 is now described. As shown in FIGS. 4 and 5, in this embodiment, the main unit 3 includes the planetary reducer 30, a spindle 37, a socket 40 and a reaction force receiving member 4. The planetary reducer 30, the spindle 37, the socket 40 and the reaction force receiving member 4 are coaxially arranged with respect to an axis A5 of the main unit 3.

Figure 8:
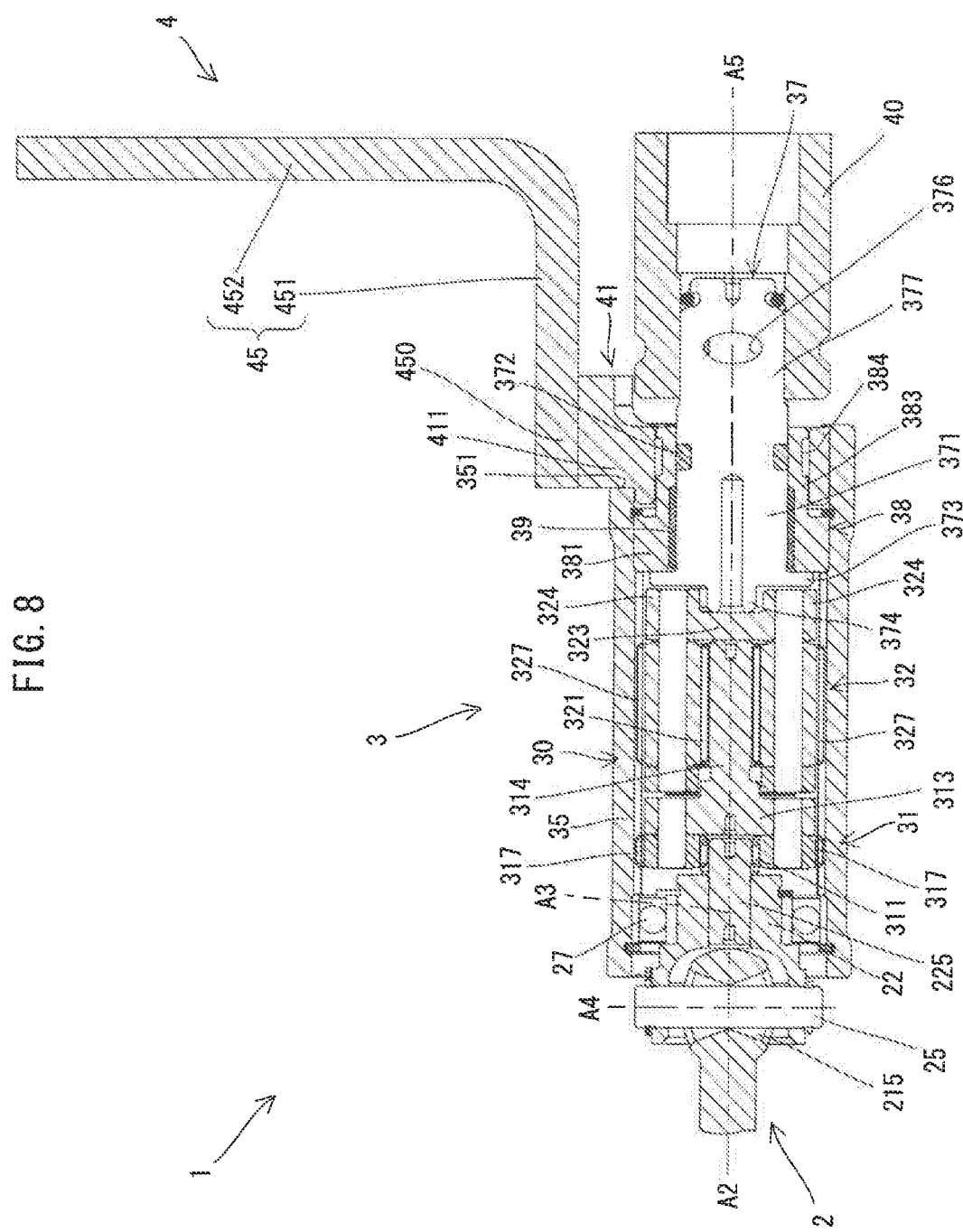
FIG. 8 is a partially enlarged view of FIG. 4, showing a main unit.
Figure 9:
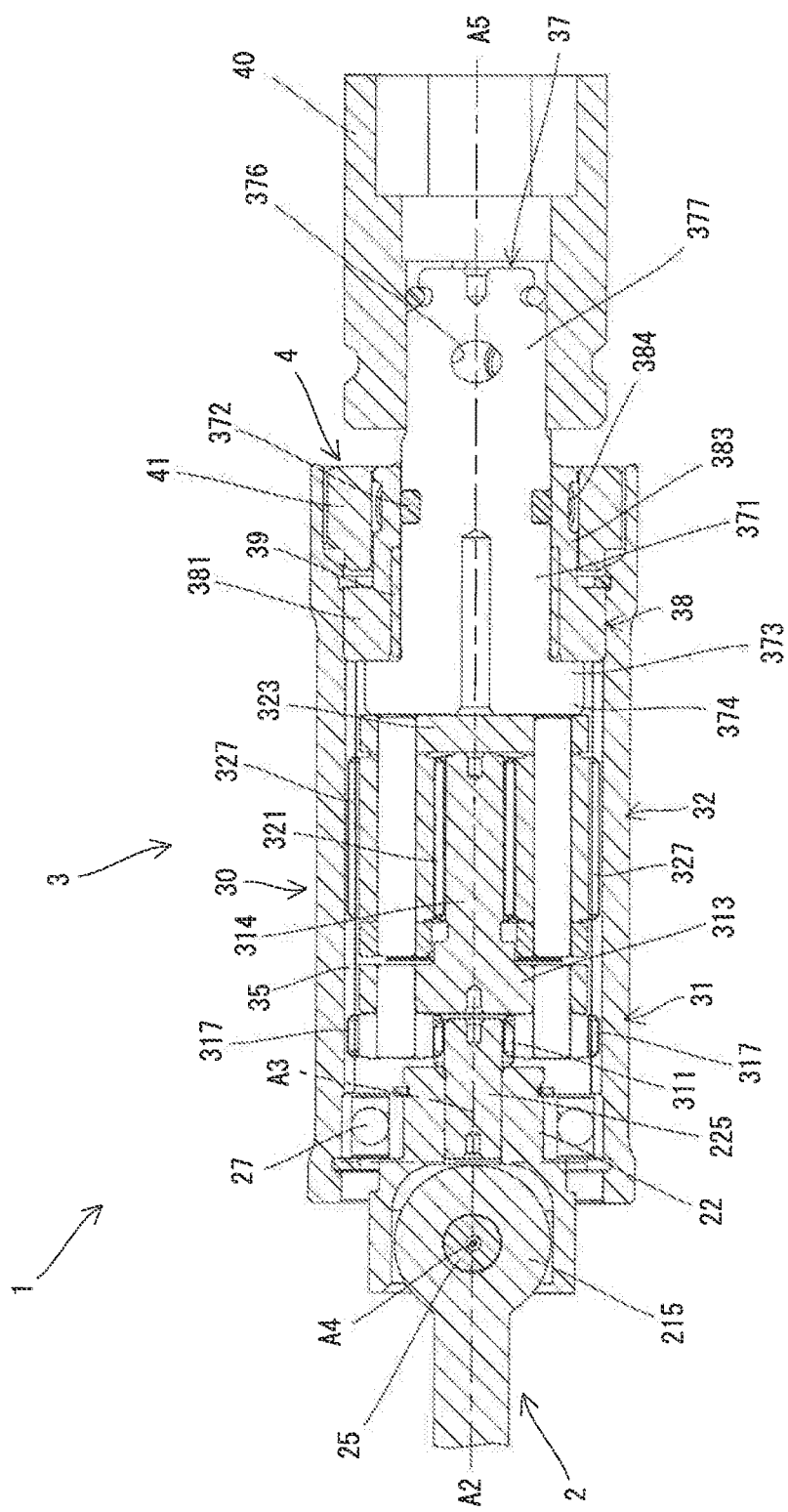
FIG. 9 is a partially enlarged view of FIG. 5, showing the main unit.

First, the planetary reducer 30 is described. The planetary reducer 30 is a speed reducing mechanism (a power increasing mechanism) which includes a plurality of planetary gear mechanisms and which is configured to increase the torque inputted via the universal joint 2 and to output the increased torque. In this embodiment, the speed reduction ratio of the planetary reducer 30 is set to 20. In other words, the planetary reducer 30 is capable of increasing the inputted torque to 20 times. As shown in FIGS. 8 and 9, in this embodiment, the planetary reducer 30 has two sets of planetary gear mechanisms, that is, a first planetary gear mechanism 31 arranged on the upstream side in the torque transmitting direction, and a second planetary gear mechanism 32 arranged on the downstream side of the first planetary gear mechanism 31. The first planetary gear mechanism 31 includes a sun gear 311, a carrier 313, four planetary gears 317 and an internal gear 35. The second planetary gear mechanism 32 includes a sun gear 321, a carrier 323, four planetary gears 327 and the internal gear 35.

In this embodiment, the internal gear 35 is a member common to the first and second planetary gear mechanisms 31, 32. Further, in this embodiment, the internal gear 35 also serves as a housing which forms an outer shell of the main unit 3, and has no gear teeth on an inner periphery of its both end parts. The second member 22 of the universal joint 2 is disposed within one end part (having no gear teeth) of the internal gear 35 such that the axis A3 coincides with the axis A5 of the main unit 3. More specifically, one end of the second member 22 on the shaft part 225 side is disposed within the one end part of the internal gear 35 and supported rotatably around the axis A5 by a ball bearing 27.

In the following description relating to directions of the main unit 3, for the sake of explanation, in the direction of the axis A5, one end part side of the internal gear 35 in which the second member 22 is disposed is referred to as an input side, and the other end part side is referred to as an output side.

The sun gear 311 of the first planetary gear mechanism 31 is fixed to a front end part of the shaft part 225 which protrudes from the second member 22 to the output side. The carrier 313 is rotatably arranged around the axis A5. The carrier 313 is rotated by revolution of the four planetary gears 317, which are engaged with the sun gear 311 and the internal gear 35, around the sun gear 311. The carrier 313 has a shaft part 314 protruding to the output side along the axis A5. The sun gear 321 of the second planetary gear mechanism 32 is fixed to the shaft part 314 of the first planetary gear mechanism 31. The carrier 323 is rotatably arranged around the axis A5. The carrier 323 is rotated by revolution of the four planetary gears 327, which are engaged with the sun gear 321 and the internal gear 35, around the sun gear 321.

Figure 10:
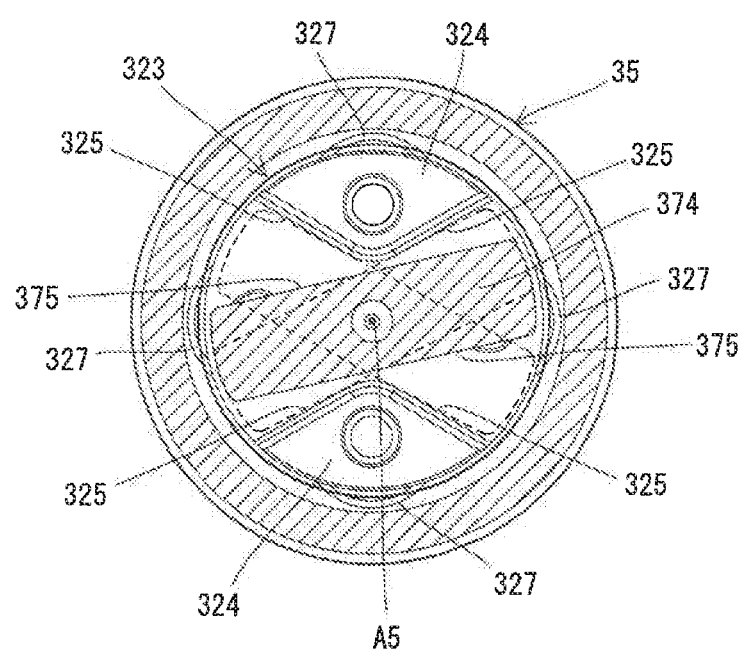
FIG. 10 is a sectional view taken along line X-X in FIG. 4.

Further, as shown in FIGS. 8 and 10, the carrier 323 of the second planetary gear mechanism 32 has two engagement projections 324. The two engagement projections 324 are formed at positions corresponding to one opposed pair of the four planetary gears 327. The two engagement projections 324 are opposed to and spaced apart from each other across the axis A5 and protrude from an output-side end surface of the carrier 323 toward the output side. The engagement projections 324 are formed symmetrically to the axis A5 and has a fan shape when viewed from the output side. Specifically, each of the engagement projections 324 has two side surfaces 325 corresponding to radius parts of the fan shape. The side surfaces 325 are formed as inclined surfaces which are inclined away from each other in the radially outward direction of the carrier 323. The angle formed by the side surfaces 325 (the center angle of the fan shape) is about 120 degrees. Further, the side surfaces 325 are each configured as a torque transmission surface that makes contact with a side surface 375 of an engagement part 374 of the spindle 37, which is described below, and transmits the torque.

As shown in FIGS. 8 and 9, a holding sleeve 38 is fixed within an output-side end part (having no gear teeth) of the internal gear 35. The holding sleeve 38 is a stepped cylindrical member having a large-diameter part 381 and a small-diameter part 383. The outer diameter of the large-diameter part 381 is substantially equal to the inner diameter of the internal gear 35, and the outer diameter of the small-diameter part 383 is smaller than that of the large-diameter part 381. The holding sleeve 38 is arranged with the large-diameter part 381 on the input side and the small-diameter part 383 on the output side, and the large-diameter part 381 is fixedly fitted into the output-side end part of the internal gear 35. Further, a metal bearing 39 is disposed within an end part of the holding sleeve 38 on the large-diameter part 381 side (input side). An annular groove 384 is formed all around an outer periphery of the small-diameter part 383.

Figure 11:
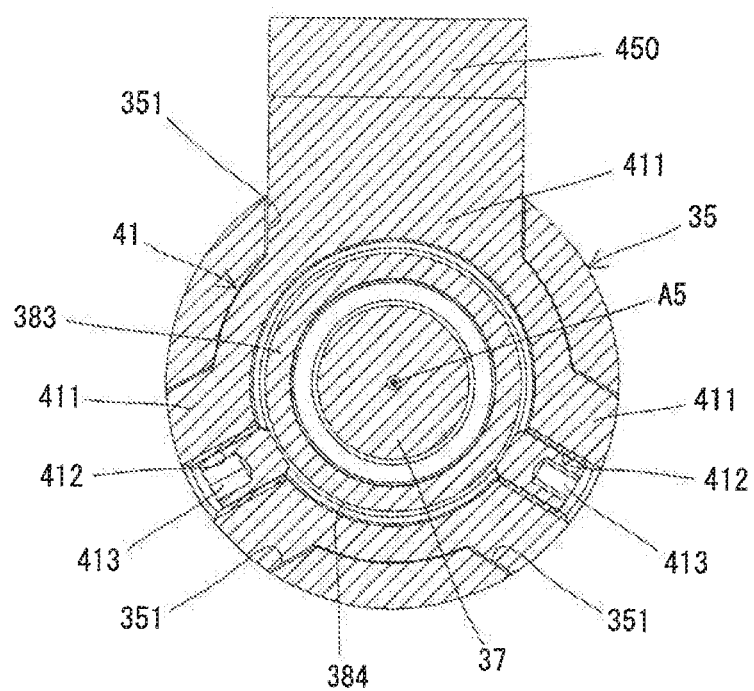
FIG. 11 is a sectional view taken along line XI-XI in FIG. 4.

Further, as shown in FIGS. 1 and 11, a plurality of engagement recesses 351 are formed in the output-side end part of the internal gear 35 in a circumferential direction around the axis A5. Each of the engagement recesses 351 is recessed in a rectangular shape from the output-side end part of the internal gear 35 toward the input side. In this embodiment, three such engagement recesses 351 are provided, and one of the recesses is formed wider in the circumferential direction than the other two. The engagement recesses 351 are provided as parts into which engagement projections 411 of the reaction force receiving member 4 (which is described below) can be fitted.

The spindle 37 is configured such that the socket 40 (which is described below) can be removably attached thereto. The spindle 37 is held by the internal gear 35 serving as the housing, so as to rotate integrally with the carrier 323 around the axis A5. As shown in FIGS. 8 and 9, in this embodiment, the spindle 37 includes a columnar part 371, a flange part 373, an engagement part 374 and a socket mounting part 377.

The columnar part 371 occupies about a half of the spindle 37 on the input side in the direction of the axis A5. The spindle 37 is configured to rotate around the axis A5 with the columnar part 371 inserted through the holding sleeve 38 and partially held by the metal bearing 39. Further, an annular groove is formed all around the periphery of the columnar part 371 in a region on the output side with respect to a portion of the columnar part 371 which is held by the metal bearing 39, and an O-ring 372 is mounted in the groove. The O-ring 372 is provided as a sealing member for preventing leakage of grease from between the spindle 37 and the holding sleeve 38. The flange part 373 protrudes radially outward from an input-side end of the columnar part 371 and is disposed between an input-side end surface of the holding sleeve 38 (the metal bearing 39) and output-side end surfaces of the engagement projections 324 of the carrier 323.

The engagement part 374 has a generally rectangular column shape protruding from the flange part 373 to the input side in the direction of the axis A5. The engagement part 374 is configured to engage with the above-described engagement projections 324 of the carrier 323 and transmit the torque between the engagement projections 324 and the engagement part 374. Specifically, as shown in FIG. 10, a shape of a cross-section of the engagement part 374 perpendicular to the axis A5 is a rectangle, having long sides of a length substantially equal to the diameter of the carrier 323 and short sides of a length shorter than a distance between the two engagement projections 324 of the carrier 323. The two side surfaces 375 corresponding to the long sides of the rectangular section of the engagement part 374 are each configured as a torque transmission surface that makes contact with the side surface 325 of the engagement projection 324 and transmits the torque.

The engagement part 374 is arranged between the two engagement projections 324 of the carrier 323. The engagement part 374 is also arranged between the holding sleeve 38 and the carrier 323 while the protruding end surface (input-side end surface in the direction of the axis A5) of the engagement part 374 is held in contact with the output-side end surface of the carrier 323. As shown in dotted lines in FIG. 10, the spindle 37 can rotate around the axis A5 with respect to the carrier 323 up to a position at which the side surfaces 375 of the engagement part 374 come into contact with the side surfaces 325 of the engagement projections 324. In this embodiment, as described above, the angle formed by the side surfaces 325 of the engagement projection 324 is about 120 degrees, so that the spindle 37 can rotate within an angle range of about 60 degrees with respect to the carrier 323.

The socket mounting part 377 protrudes from the columnar part 371 to the output side in the direction of the axis A5. As shown in FIGS. 8 and 9, the socket mounting part 377 protrudes from the output-side end of the internal gear 35 to the outside along the axis A5. The socket mounting part 377 is configured such that the socket 40 can be removably attached thereto.

The structures of the socket mounting part 377 and the socket 40 themselves are well known and are only briefly explained here. The socket mounting part 377 has a rectangular column shape and has a through hole 376 which extends therethrough in a direction perpendicular to the axis A5 and through which a pin (not shown) for preventing coming off is inserted. The socket 40 has a cylindrical shape as a whole. An inner periphery of a base end part of the socket 40 is configured to be fitted onto the socket mounting part 377. The socket 40 is mounted onto the spindle 37 by fitting the base end part of the socket 40 onto the socket mounting part 377, inserting the pin (not shown) through a through hole (not shown) formed in the socket 40 and the through hole 376, and preventing the pin from coming off by an O-ring (not shown) on the outer periphery of the socket 40. Further, the inner periphery of a front end part of the socket 40 is configured to be engaged with a nut (not shown) (typically to have a hexagonal section).

A plural kinds of the sockets 40 which can be removably attached to the attachment 1 are available so as to be used for bolts or nuts having different sizes (diameters). The user can mount an appropriate one of the sockets 40 to the spindle 37 according to the size of a bolt or nut to be used.

In the planetary reducer 30 having the above-described structure, the torque inputted via the universal joint 2 is transmitted to the first planetary gear mechanism 31 and then to the second planetary gear mechanism 32. Specifically, the sun gear 311 of the first planetary gear mechanism 31 rotates together with the shaft part 225 of the universal joint 2. The planetary gears 317 rotate the carrier 313 (the shaft part 314) around the axis A5 in the same direction as the shaft part 225 by revolving around the sun gear 311 while rotating. Similar torque transmission is also performed in the second planetary gear mechanism 32, and the carrier 323 rotates in the same direction as the shaft part 225. Further, when the carrier 323 rotates, as shown by dotted lines in FIG. 10, the side surfaces 325 of the two engagement projections 324 formed on the output-side end of the carrier 323 come into contact with the side surfaces 375 of the engagement part 374 of the spindle 37 and transmit torque of the carrier 323 to the spindle 37. Thus, the spindle 37 and the socket 40 rotate together with the carrier 323.

In the first and second planetary gear mechanisms 31, 32, a reaction force caused by rotation of the carriers 313, 323 acts to rotate, via the planetary gears 317, 327, the internal gear 35 in the opposite direction to the rotation of the carriers 313, 323.

As described above, in the planetary reducer 30, the internal gear 35 and the carrier 323 are configured as two final output shafts which can rotate in directions opposite to each other. Therefore, the internal gear 35 and the carrier 323 are hereinafter also referred to as a first output shaft 35 and a second output shaft 323, respectively.

The reaction force receiving member 4 is now described. As shown in FIGS. 8 and 9, the reaction force receiving member 4 is connected to the first output shaft (internal gear) 30. The reaction force receiving member 4 is configured to rotate in the opposite direction to the rotation of the second output shaft (carrier) 323 by the reaction force caused by the rotation of the socket 40 which is integrally rotatably connected to the second output shaft 323 via the spindle 37. The reaction force receiving member 4 is configured to make contact with a contact object (an adjacent bolt or nut, for example) located in the vicinity of a bolt or nut to be fastened and thereby make it possible for the contact object to receive the reaction force. In this embodiment, the reaction force receiving member 4 includes a base part 41 configured to be removably attached to the output-side end part of the internal gear 35 and an arm part 45 protruding from the base part 41.

The base part 41 has a short circular cylindrical shape and has an inner diameter substantially equal to the outer diameter of the small-diameter part 383 of the above-described holding sleeve 38. As shown in FIGS. 1 and 11, the base part 41 has a plurality of engagement projections 411 formed in the circumferential direction around the axis A5. The engagement projections 411 are rectangularly shaped to be fitted into the engagement recesses 351 of the internal gear 35 and protrude radially outward. In this embodiment, three such engagement projections 411 are provided, and one of the projections is formed wider in the circumferential direction than the other two. The two narrow engagement projections 411 each have a radially extending screw hole 412.

The base part 41 is inserted between an inner periphery of the internal gear 35 and an outer periphery of the small-diameter part 383 while the engagement projections 411 are fitted in the engagement recesses 351 of the internal gear 35. Further, the screws 413 are screwed into the screw holes 412 until tips of the screws 413 come into contact with the groove 384 on the outer periphery of the small-diameter part 383. In this manner, the base part 41 is fixed to the internal gear 35 and the holding sleeve 38, so that the reaction force receiving member 4 can rotate integrally with the internal gear 35.

As shown in FIGS. 1 and 8, in this embodiment, the arm part 45 is generally L-shaped as a whole. The arm part 45 includes an extending part 451 and a contact part 452. The extending part 451 is connected to the base part 41 and extends in a direction away from the internal gear 35 in the direction of the axis A5. A base part of the arm part 45, that is, a base end region 450, is joined to a radially outer side of the wide one of the three engagement projections 411 of the base part 41. The contact part 452 is bent from a front end of the extending part 451 and extends radially outward. The contact part 452 is set at substantially the same position as a front end of the socket 40 mounted to the spindle 37 in the direction of the axis A5.

A plural kinds of reaction force receiving members 4 different in length and shape of the arm part 45 are available so as to cope with various arrangement relations between a bolt or nut to be fastened and a contact object. The user can connect an appropriate one of the reaction force receiving members 4 to the internal gear 35 according to the actual arrangement relation between the bolt or nut to be fastened and the contact object.

The nut fastening and loosening operations are now briefly described as examples of operations with the driver drill 5 with the attachment 1 mounted thereto.

When performing an operation of fastening a nut, the user switches the normal/reverse changeover lever 513 to a position for the normal rotation. The operation mode of the driver drill 5 may be either one of the screw fastening mode and the drilling mode. In the screw fastening mode, the user may turn the torque adjusting ring 515 so as to appropriately set a threshold for a torque, that is, a target torque for the fastening torque of the nut, at which the clutch mechanism 54 will be actuated, depending the type (the nominal diameter, etc.) of the bolt or nut. The threshold may be set taking into consideration that the speed reduction ratio of the planetary reducer 30 is 20, that is, the torque of the spindle 55 will be increased to 20 times. For example, the user can set the target torque of 120 N·m by setting the threshold for the torque of 6 N·m at which the clutch mechanism 54 will be actuated. Similarly, the speed change lever 511 may be switched by the user, taking into consideration that the output torque of the spindle 55 changes according to the switching position of the speed change lever 511. The user then attaches the attachment 1 to the driver drill 5 via the connection part 213 by loosening the chuck 58, inserting the connection part 213 of the attachment 1 into the tool insertion hole 583 and tightening the chuck 58.

Subsequently, the user engages the socket 40 coupled to the attachment 1 with the nut. At this time, a space large enough to arrange the driving axis A1 of the driver drill 5, the axis A2 of the shaft part 211 of the attachment 1 and the axis A5 of the main unit 3 on one straight line as shown in FIG. 3 may not be secured in some operation environments. As described above, the shaft part 211 of the universal joint 2 is configured such that the relative position and angle with respect to the second member 22 (i.e. the relative position and angle with respect to the main unit 3) can be freely changed (see FIGS. 4 and 5). In other words, the user can freely change the relative arrangement relation between the driver drill 5 with the shaft part 211 connected thereto and the main unit 3. Thus, the user can appropriately adjust this arrangement relation according to the operation environment.

Further, in order to engage the socket 40 having a polygonal (typically hexagonal) section with the nut, it is required to adjust the position of the socket 40 with respect to the nut in the circumferential direction around the axis A5. As described above, in this embodiment, the spindle 37 with the socket 40 connected thereto is configured to rotate within an angle range of about 60 degrees around the axis A5 with respect to the carrier 323 of the planetary reducer 30 (see FIG. 10). Therefore, the user can easily engage the socket 40 with the nut by turning the socket 40 within this angle range.

When the user depresses the trigger 571, the controller 577 drives the motor 52 to rotate the output shaft 521 in the normal rotation direction. Then the spindle 55 is rotationally driven around the driving axis A1 via the planetary reducer 53. The torque of the spindle 55 (the chuck 58) is transmitted to the universal joint 2 via the connection part 213 and further transmitted to the planetary reducer 30 via the shaft part 225. The socket 40 which is integrally rotatably connected to the second output shaft 323 of the planetary reducer 30 via the spindle 37 is turned in a direction of fastening the nut. As described above, the speed reduction ratio of the planetary reducer 30 is 20. Therefore, when the torque of the spindle 55 of the driver drill 5 is 5 Nm, the torque of the second output shaft 323 is increased up to 100 N·m which is sufficient to fasten a nut having a nominal diameter of M12.

When the socket 40 integrally rotates with the second output shaft 323, a torque in the opposite direction acts on the first output shaft 35, as the reaction force. Therefore, the reaction force receiving member 4 connected to the first output shaft 35 starts rotating around the axis A5 in the direction opposite to the socket 40 at a certain time. When the reaction force receiving member 4 rotates and the arm part 45 (particularly the contact part 452) comes into contact with the contact object (another nut or bolt, for example) located adjacent to the nut to be fastened, the contact object receives, via the reaction force receiving member 4, the reaction force caused by the rotation of the socket 40. When the contact object receives the reaction force via the arm part 45, a strong force is applied to the base end region 450 of the arm part 45 in the circumferential direction around the axis A5. Therefore, in order to secure the strength of the base end region 450, as described above, the engagement projection 411 formed corresponding to the base end region 450 and the engagement recess 351 corresponding to this engagement projection 411 are wider in the circumferential direction than the other engagement projections 411 and the other engagement recesses 351, respectively. Thus, the risk of breakage of the arm part 45 can be reduced.

In a case where the screw fastening mode is set as the operation mode, the clutch mechanism 54 is actuated when the fastening torque reaches the target torque, the driving of the spindle 55 is stopped, and thus the fastening operation is completed. Alternatively, in a case where the user confirms that the nut is seated and releases the trigger 571, the controller 577 stops the driving of the motor, and thus the fastening operation is completed.

It is noted that, in the present embodiment, in a case where the screw fastening mode is set as the operation mode and the motor 52 is driven such that the output shaft 521 is rotated in the normal rotation direction, the controller 577 drives the motor 52 at a preset rotation speed (a number of rotations per unit time). In the present embodiment, the rotation speed at this time is set such that the rotation speed of the reaction force receiving member 4 (the first output shaft 35) falls within a range from 60 rpm (rotations per minute) through 100 rpm. This range of the rotation speed is set based on: (a) a time from when the driving of the motor 52 is started to when the fastening torque reaches the target torque; and (b) a time which is required for the user to take an action to avoid an interference between the arm part 45 and an intervening object, when the intervening object exists between the arm part 45 and the contact object. This feature is described below.

As a fastening tool that is configured to fasten a bolt or nut, similar to the driver drill 5 with the attachment 1 attached thereto, so-called rotary impact tools are known. Such impact tools may include an impact wrench, an impact driver and so on. The the driver drill 5 with the attachment 1 attached thereto may be used in place of the rotary impact tool, as a fastening tool which generates less noises during the fastening operation of the bolt or nut, compared to the rotary impact tool. Here, referring to FIG. 12, time-dependent changes of axial forces (tightening forces) of a known impact wrench having a reaction receiving member and the driver drill 5 with the attachment 1 attached thereto during the fastening operation. The fastening operations were performed by the driver drill 5 in a state in which the rotation speed of the reaction force receiving member 4 was set to 60 rpm, 80 rpm, and 100 rpm. The fastening operation was performed by the impact wrench in a state in which the rotation speed of the reaction force receiving member was 2,800 rpm. In order to compare times required for the axial forces to reach a prescribed axial force F (in other words, times required for the fastening torques to reach the target torque to complete the fastening operations), each fastening operation was performed under the following conditions: (a) a nut is first fastened (tightened) on a bolt (classified as M12) by hand; and (b) the nut is then fastened (tightened) by three threads to be seated using the driver drill 5 with the attachment 1 attached thereto, or using the impact wrench.

As a result, three threads of the bolt were exposed above the nut when the fastening operation is completed.

Figure 12:
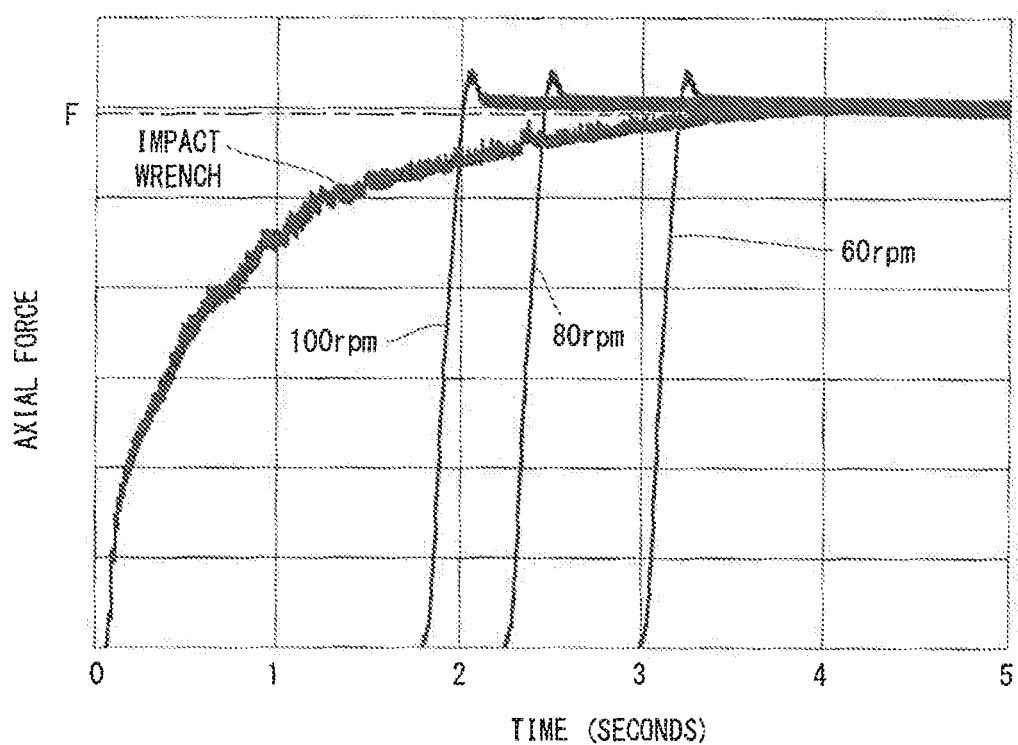
FIG. 12 is a graph, showing time-dependent changes of axial forces during fastening operation of a known impact wrench and the driver drill with the attachment attached thereto.

As shown in FIG. 12, with the impact wrench, the nut was seated 0.064 seconds after the start of the fastening, and the axial force started to increase, and it took about 4 seconds for the axial force to reach the prescribed axial force F. When the driver drill 5 with the attachment 1 attached thereto was used with the rotation speed of 60 rpm, the nut was seated 3 seconds after the start of the fastening. However, the axial force rapidly increases afterwards, and reached the prescribed axial force F about 3.5 seconds after the start of the fastening. When the rotation speed was set at 80 rpm, the nut was seated about 2.25 seconds and the axial force reached the prescribed axial force F about 2.75 seconds after the start of the fastening. When the rotation speed was set at 100 rpm, the nut was seated about 1.8 seconds and the axial force reached the prescribed axial force F about 2.3 seconds after the start of the fastening.

The results of comparison described above shows that, when the rotation speed of the reaction force receiving member 4 (the first output shaft 35) is 60 rpm or faster, the driver drill 5 with the attachment 1 attached thereto can complete the fastening operation in a time period which is as short as, or shorter than a time period in which the impact wrench can complete the fastening operation. On the other hand, there is a possibility that the arm part 45 may interfere with an intervening object, if the arm part 45 is disposed apart from the contact object and the fastening operation is started with the intervening object existing between the arm part 45 and the contact object. As the rotation speed of the reaction force receiving member 4 (that is, the rotation speed of the socket 40 (the second output shaft 37)) is increased, the time required for the fastening can be shortened. However, in consideration of a reaction time required for a person's body to react after the person visually recognizes an object, the rotation speed of the reaction force receiving member 4 may preferably be not faster than 100 rpm. On the other hand, if the rotation speed of the reaction force receiving member 4 is less than 60 rpm, the time required for the fastening may be longer than that of the rotary impact tool.

For that reason, in the present embodiment, by setting the rotation speed of the reaction receiving member 4 within the range from 60 rpm through 100 rpm, it may be possible to ensure the work efficiency that is generally equal to, or greater than that of the rotary impact tool, while reducing the possibility of interference between the arm part 45 and the intervening object. It may be more preferable for the rotation speed of the reaction receiving member 4 to fall within a range from 70 rpm through 90 rpm, and further preferable to be about 80 rpm.

When performing an operation of loosening a nut, user switches the normal/reverse changeover lever 513 to a position for reverse rotation and then, like in the fastening operation, engages the socket 40 coupled to the attachment 1 with the nut. When the user presses the trigger 57, the controller 577 drives the motor 52 such that the output shaft 521 rotates in the reverse rotation direction. When the user releases the trigger 57 as desired, the controller 57 stops the driving of the motor 52, and thus the loosening operation is completed. It is noted that a greater torque is required to loosen the nut that has been fully tightened, as compared to the fastening torque required during the fastening operation. Therefore, in the present embodiment, a torque value for the loosening operation is set to be larger than a maximum value for the torque for the fastening operation. In other words, the torque value for the loosening operation is larger than a possible largest value that can be set as the target torque. This makes it possible to loosen the bolt or nut with an appropriate torque.

As described above, when the attachment 1 of this embodiment is attached to the driver drill 5, the torque of the spindle 55, which is the final output shaft of the driver drill 5, is transmitted to the planetary reducer 30 via the universal joint 2 and further increased by the planetary reducer 30. Particularly, in this embodiment, the speed reduction ratio of the planetary reducer 30 is 20, so that the planetary reducer 30 is capable of increasing the torque inputted via the universal joint 2 to 20 times. Therefore, the driver drill 5 which is lighter and less expensive than a dedicated fastening tool with a reaction receiver can be used to fasten bolts or nuts having a large nominal diameter.

Further, the universal join 2 which connects the driver drill 5 and the planetary reducer 30 is a shaft coupling which is configured to transmit the torque without being affected by a change of the position or angle relation between the axis A2 of the shaft part 211 and the axis A5 of the planetary reducer 30. Therefore, the user can freely change the relative position and angle of the driver drill 5 with respect to the main unit 3 according to the environment in which an operation of fastening bolts or nuts is performed. Thus, the workability of the driver drill 5 with the attachment 1 attached thereto can be improved.

Further, in this embodiment, the reaction force receiving member 4 is connected to the internal gear 35 of the second planetary gear mechanism 32, and the socket 40 is removably attached to the carrier 323 of the second planetary gear mechanism 32 via the spindle 37 so as to rotate together with the carrier 323. Thus, the attachment 1 having a compact and rational structure can be realized.

Correspondences between the features of the embodiment and the features of the present teachings are as follows:

The driver drill 5, the motor 52, the output shaft 521, the spindle 55, and the torque adjusting ring 515 are examples that correspond to the "fastening tool", the "motor", "the motor shaft", the "final output shaft", and "the torque setting member", respectively, according to the present teachings. The attachment 1 is an example that corresponds to the "attachment" according to the present teachings. The planetary reducer 30, the internal gear 35 and the carrier 323 are examples that correspond to the "planetary reducer", the "first output shaft" and the "second output shaft", respectively, according to the present teachings. The reaction force receiving member 4 and the arm part 45 are examples that correspond to the "reaction force receiving member" and the "arm part", respectively, according to the present teachings. The universal joint 2, the connection part 213 and the shaft part 225 are examples that correspond to the "universal joint", the "input-side end part" and the "output-side end part", respectively, according to the present teachings. The socket 40 is an example that corresponds to the "socket" according to the present teachings.

Each of the first planetary gear mechanism 31 and the second planetary gear mechanism 32 is an example that corresponds to the "planetary gear mechanism" according to the present teachings. Each of the sun gear 311 and the sun gear 321 is an example that corresponds to the "sun gear" according to the present teachings. Each of the planetary gears 317 and the planetary gears 327 is an example that corresponds to the "planetary gear" according to the present teachings. The internal gear 35 is an example that corresponds to the "internal gear" according to the present teachings. The three engagement projections 411 are examples that correspond to the "projections" according to the present teachings. The three engagement recesses 351 are examples that correspond to the "recesses" according to the present teachings.

The above-described embodiment is merely an example, and an attachment and a fastening tool according to the present teachings are not limited to the structures of the attachment 1 and the driver drill 5 that have been described above. For example, they may be modified as follows. One or more of the following modifications may be used in combination with the attachment 1 or the driver drill 5 of the embodiment or with the claimed attachment or fastening tool.

In the above-described embodiment, the driver drill 5 is described as an example of the fastening tool, but the fastening tool to which the attachment 1 can be removably attached is not limited to the driver drill 5. For example, it may be a screwdriver. Further, the fastening tool is not limited to a tool for fastening screws, but it may be a rotary tool (such as an electric drill) having a chuck which is turned around the driving axis A1 in order to fasten and mount a tool accessory thereto, and configured to rotationally drive the final output shaft around the driving axis A1 and thereby rotationally drive the tool accessory.

As long as the universal joint 2 is configured to transmit a torque inputted via the input-side end part to the planetary reducer 30 via the output-side end part, its structure is not limited to that of the above-described embodiment. For example, a cross shaft universal joint may be used in place of the ball type universal joint. The number of the planetary gear mechanisms of the planetary reducer 30 may not be limited to two, but it may be one or three or more. The structure of the planetary gear mechanisms may also be appropriately modified. The speed reduction ratio of the planetary reducer 30 is not limited to 20, but it is preferable to be 10 or more in order to perform an operation of fastening bolts or nuts which require a high torque by using a fastening tool having a relatively low output torque.

The reaction force receiving member 4 may not be directly connected to the internal gear 35, but to a separate member which can rotate integrally with the internal gear 35. Further, the internal gear 35 and the reaction force receiving member 4 may not be necessarily connected to each other by engagement of the engagement recesses 351 and the engagement projections 411, but other connecting structures may be employed. The socket 40 may not be connected to the spindle 37 which is separately formed from the carrier 323, but to a shaft part which may be formed as a part of the carrier 323 like the shaft part 314 of the carrier 313.

DESCRIPTION OF NUMERALS

1: attachment
2: universal joint
21: first member
211: shaft part
213: connection part
215: spherical part
216: through hole
22: second member
221: recess
223: through hole
225: shaft part
25: pin
27: ball bearing
3: main unit
30: planetary reducer 31: first planetary gear mechanism
311: sun gear
313: carrier
314: shaft part
317: planetary gear
32: second planetary gear mechanism
321: sun gear
323: carrier
324: engagement projection
325: side surface
327: planetary gear
35: internal gear (first output shaft)
351: engagement recess
37: spindle (second output shaft)
371: columnar part
372: O-ring
374: engagement part
375: side surface
376: through hole
377: socket mounting part
38: holding sleeve
381: large-diameter part
383: small-diameter part
384: groove
39: metal bearing
4: reaction force receiving member
41: base part
411: engagement projection
412: screw hole
413: screw
45: arm part
450: base end region
451: extending part
452: contact part
40: socket
5: driver drill
51: body housing
511: speed change lever
513: normal/reverse changeover lever
515: torque adjusting ring
517: mode switching ring
52: motor
521: output shaft
53: planetary reducer
54: clutch mechanism
55: spindle
57: handle
571: trigger
573: switch
575: battery mounting part
577: controller
58: chuck
581: bolt
583: tool insertion hole
9: battery
A1: driving axis
A2: axis
A3: axis
A4: axis
A5: axis

What is claimed is:

1. An attachment configured to be removably attached to a fastening tool, the fastening tool having a final output shaft configured to be rotationally driven by power of a motor, the attachment comprising:
a planetary reducer having a first output shaft and a second output shaft, the first and second output shafts being coaxially arranged and rotatable in opposite directions to each other;
a reaction force receiving member connected to the first output shaft so as to rotate integrally with the first output shaft, the reaction force receiving member having an arm part for contact with an external contact object; and
a universal joint configured to transmit a torque, the universal joint having an input-side end part to which the torque is inputted and an output-side end part from which the torque is outputted, the input-side end part being configured to be connectable to the final output shaft of the fastening tool, and the output-side end part being connected to the planetary reducer, wherein:
the second output shaft is configured to be connectable to a socket such that the socket rotates integrally with the second output shaft, the socket being engageable with a bolt or a nut,
the reaction force receiving member is configured to rotate integrally with the first output shaft in a direction opposite to the second output shaft by a reaction force caused by rotation of the socket, and
the universal joint is configured to transmit the torque inputted from the final output shaft via the input-side end part, to the planetary reducer via the output-side end part.

2. The attachment as defined in claim 1, wherein:
the planetary reducer includes at least one planetary gear mechanism each having a sun gear, planetary gears, a carrier, and an internal gear,
the first output shaft is the internal gear of a final stage planetary gear mechanism of the at least one planetary gear mechanism, and
the second output shaft is the carrier of the final stage planetary gear mechanism.

3. The attachment as defined in claim 1, wherein a speed reduction ratio of the planetary reducer is at least 10.

4. The attachment as defined in claim 1, wherein:
the reaction force receiving member has projections formed in a circumferential direction around a rotation axis of the first output shaft,
the first output shaft has recesses formed in the circumferential direction,
the reaction force receiving member and the first output shaft are connected to each other by engagement between the projections and the recesses, and
one of the projections formed corresponding to a base end region of the arm part and one of the recesses formed corresponding to this projection are wider in the circumferential direction than the other projections and the other recesses, respectively.

5. A fastening tool, comprising:
a motor having a rotor and a motor shaft, the motor shaft being configured to rotate integrally with the rotor;
a final output shaft configured to be rotationally driven by power of the motor; and
the attachment as defined in claim 1, the attachment being removably connected to the final output shaft so as to rotate integrally with the final output shaft.

6. The fastening tool as defined in claim 5, wherein:
the fastening tool is configured to operate at least in a fastening operation mode, in which the motor shaft is rotated in a normal rotation direction to fasten the bolt or the nut and driving of the final output shaft is stopped when a fastening torque of the bolt or the nut reaches a preset target torque, and a rotation speed of the reaction force receiving member is set based on a time from when driving of the motor is started and to when the fastening torque reaches the preset target torque and a time required for a user to take an action to avoid an interference between the arm part and an intervening object when the intervening object exists between the arm part and the external contact object.

7. The fastening tool as defined in claim 5, wherein a rotation speed of the reaction force receiving member is set in a range from 60 rpm through 100 rpm.

8. The fastening tool as defined in claim 6, further comprising:

a torque setting member configured to set the target torque in response to an external operation by the user.

9. The fastening tool as defined in claim 6, wherein:

the fastening tool is further configured to operate in a loosening operation mode, in which the motor shaft is rotated in a reverse rotation direction to loosen the bolt or the nut, and a torque of the second output shaft in the loosening operation mode is set to be greater than a maximum torque of the second output shaft in the fastening operation mode.

* * * * *